United States Patent
Chinigo et al.

(10) Patent No.: US 6,556,903 B2
(45) Date of Patent: Apr. 29, 2003

(54) SAFETY SYSTEM FOR SCHOOL BUSES

(76) Inventors: Andrew M. Chinigo, 1437 Cantoria Ave., Coral Gables, FL (US) 33146; Martin Fleit, 520 Brickell Key Dr. #A201, Miami, FL (US) 33131; Peter J. Quinones, 5815 SW. 45th Ter., Miami, FL (US) 33155

(*) Notice: Subject to any disclaimer, the term of this patent is extended or adjusted under 35 U.S.C. 154(b) by 0 days.

(21) Appl. No.: 10/212,446

(22) Filed: Aug. 5, 2002

(65) Prior Publication Data

US 2003/0014166 A1 Jan. 16, 2003

Related U.S. Application Data

(63) Continuation of application No. 09/716,799, filed on Nov. 20, 2000.

(51) Int. Cl.[7] .................... G01C 22/00; B60Q 1/26
(52) U.S. Cl. ................................ 701/29; 340/433
(58) Field of Search .................. 701/19–26, 29–35, 701/45, 65, 108–109, 111, 200–202, 208–209, 211–215; 180/268, 271–273, 287; 348/143, 148, 151–152; 340/425.5–426, 433, 438–439, 471–472, 988–995

(56) References Cited

U.S. PATENT DOCUMENTS

| | | | | |
|---|---|---|---|---|
| 5,319,394 A | * | 6/1994 | Dukek | 348/148 |
| 5,382,953 A | * | 1/1995 | Hauptli | 340/937 |
| 5,920,057 A | * | 7/1999 | Sonderegger et al. | 235/384 |
| 6,006,159 A | * | 12/1999 | Schmier et al. | 701/200 |
| 6,073,062 A | * | 6/2000 | Hoshino et al. | 701/3 |
| 6,161,071 A | * | 12/2000 | Shuman et al. | 701/48 |
| 6,215,395 B1 | * | 4/2001 | Slaughter et al. | 340/457.1 |

* cited by examiner

*Primary Examiner*—Thu Nguyen
(74) *Attorney, Agent, or Firm*—Martin Fleit; Paul D. Bianco; Fleit, Kain, Gibbons, Gutman & Bongini P.L.

(57) ABSTRACT

A safety system and method for school buses in which sensors are associated with each seat to sense if a person is occupying the seat and if the seat belt is buckled. A display, within the vision of the bus driver, shows the condition of each seat. Sensors determine the head count of students on the bus. An alarm signals a mismatch between the head count and seats occupied. A telecommunications link and a global positioning system provides bus location to a remote station. Additional sensors detect shook, heat, smoke, CO, water and tire pressure.

29 Claims, 9 Drawing Sheets

SAFETY SYSTEM FOR SCHOOL BUSES

RELATED APPLICATION

This application is a continuation of application Ser. No. 09/716,799 filed Nov. 20, 2000.

BACKGROUND OF THE INVENTION

1. Field of Invention

The present invention relates to a safety system for buses, and more particularly, to a safety system for school buses.

2. Prior Art

The safety of school children and other students who travel by bus to and from school, is constantly a concern. Since students on a bus have been known to be difficult to control in that they do not always maintain their seats, this is a particular cause for concern, and can produce injuries due to the fact that the bus is mostly in motion. The problem is further exacerbated if the bus is involved in an accident such as a collision with another vehicle. Also, it is difficult for the bus operator to know how many persons are occupying seats in the bus at any given time. The driver lacks the ability to continuously monitor the status of the passengers while operating the vehicle. Still further, there is no way for a central location, for example the depot from which the bus originates, to know the operational condition of the bus as it proceeds on its route. Whereas there have been developments proposed in the prior art regarding different aspects of the overall problem, no one has as yet developed a comprehensive fully integrated system to deal with the entire range of issues involved in the transportation of students by bus to and from a school.

SUMMARY OF THE INVENTION

It is accordingly, the principal object of the present invention to provide a safety system for buses, and in particular school buses, that operates taking into account the entire range of issue involved. This is accomplished by the present invention by providing a school bus with a host of sensors utilizing state-of-the-art technology so that implementation is readily effected without any substantial redesign of the basic structure of the bus, and without requiring any significant modification of the vehicular structure. In addition, the functional activities to be controlled are constantly monitored, with reporting to a central location.

Other objects and advantages will become more evident from the following detailed description of a specific preferred embodiment of the invention when taken in conjunction with the appended drawings.

DETAILED DESCRIPTION OF SPECIFIC PREFERRED EMBODIMENT

Figure 1:
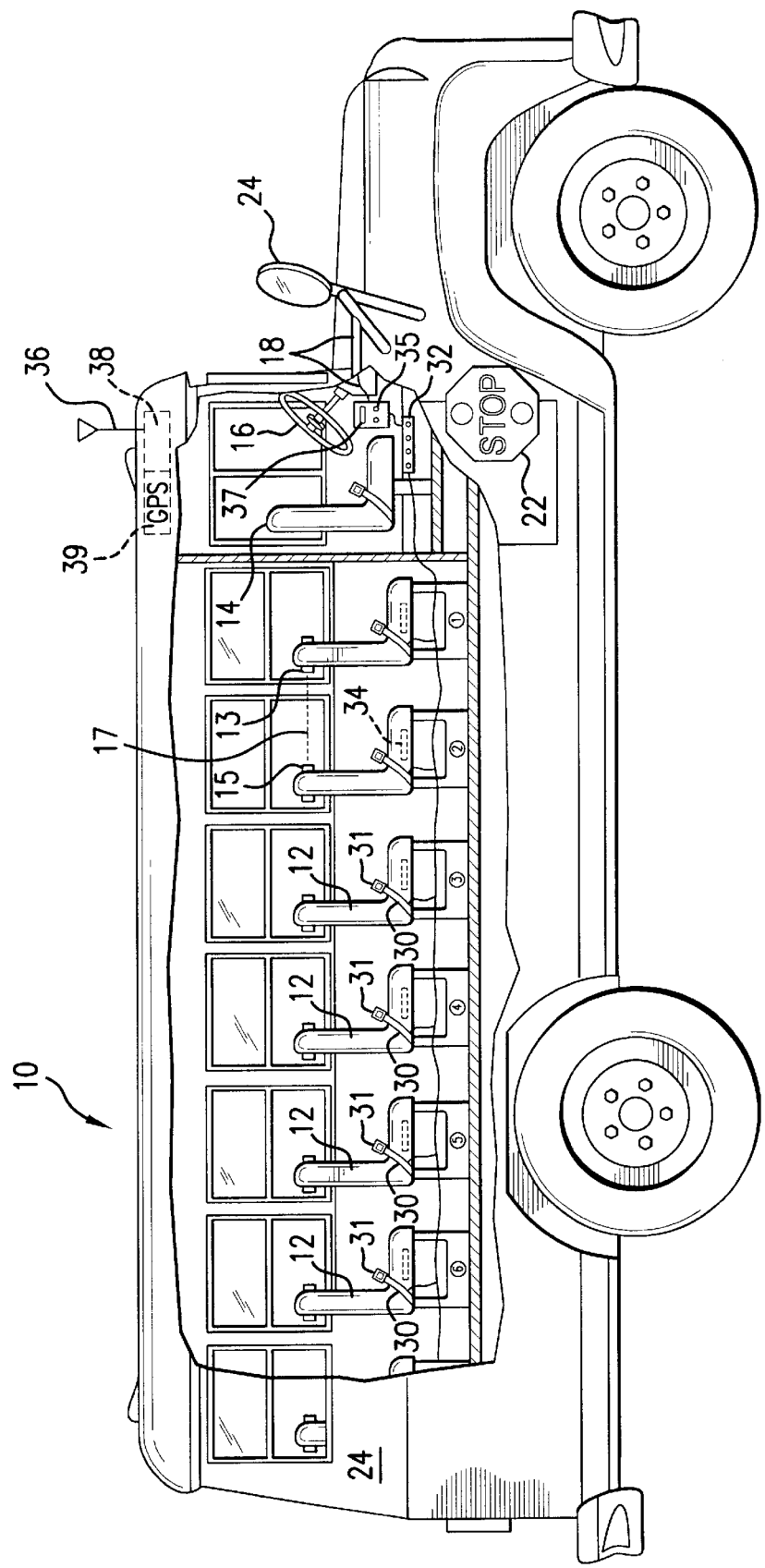
FIG. 1 is a side view of a bus partly broken away to show the interior and more particularly, to show the seats and the driver's position.

As noted above, the present invention relates to a safety system for a bus, and more particularly to a school bus transporting students or pupils. Referring to FIG. 1, the system consists of a conventional school bus 10 with its interior fitted with seats 12, usually two bench seats per row divided by a central aisle (not shown), and provided with an entry door at the front, optionally, an exit door midway along the side of the bus (not shown), and a rear emergency door (not shown). In addition, at the front of the bus is a space for a driver's seat 14, a steering wheel 16 and a dashboard 18 on which are mounted instruments associated with the vehicle operation or condition. Further, the bus is provided with emergency lights 20 (one of which is shown at the rear of the bus) to indicate either an emergency or that the bus is stopped to allow students to embark or disembark. The bus is equipped with the safety equipment required by law, such as, a side view mirror 24, a rear view mirror and a stop sign 22 that swings out when the bus stops.

The safety system of the present invention further consists of each seat 12 being fitted with a seat belt 30 of conventional type that consists of two members or straps that buckle together. The seat buckle 31 closes or opens an electrical circuit that signals the condition of the buckle, fastened or unfastened. This electrical circuit may be hardwired to a computer 32 located at the driver's station, or preferably is wirelessly coupled to the computer. Also, each seat 12 is provided with a pressure switch 34 that is hardwired to the computer 32 or coupled wirelessly. A photoelectric cell 13 is located in the back of each seat facing backwardly and juxtaposed opposite a reflective patch 15 located on the front of the following seat. When the seat is not occupied, the photoelectric cell 13 directs its beam 17 to the following seat, and the beam 17 is reflected from patch 15 back to the cell 13 where it is sensed.

The computer 32 consists of a microprocessor 33, an input keyboard 35, a display 37 and a memory. In addition, the bus 10 is outfitted with an antenna 36 to enable telecommunication or radio communication with a central station (not shown), and which may be the depot from which the school bus originated or an office in the headquarters of the school administration, or both. To this end, the computer is coupled to a transmitter/receiver 38 to enable two-way communication with the central station. A GPS 39 is associated with the transceiver 38.

Figure 2:
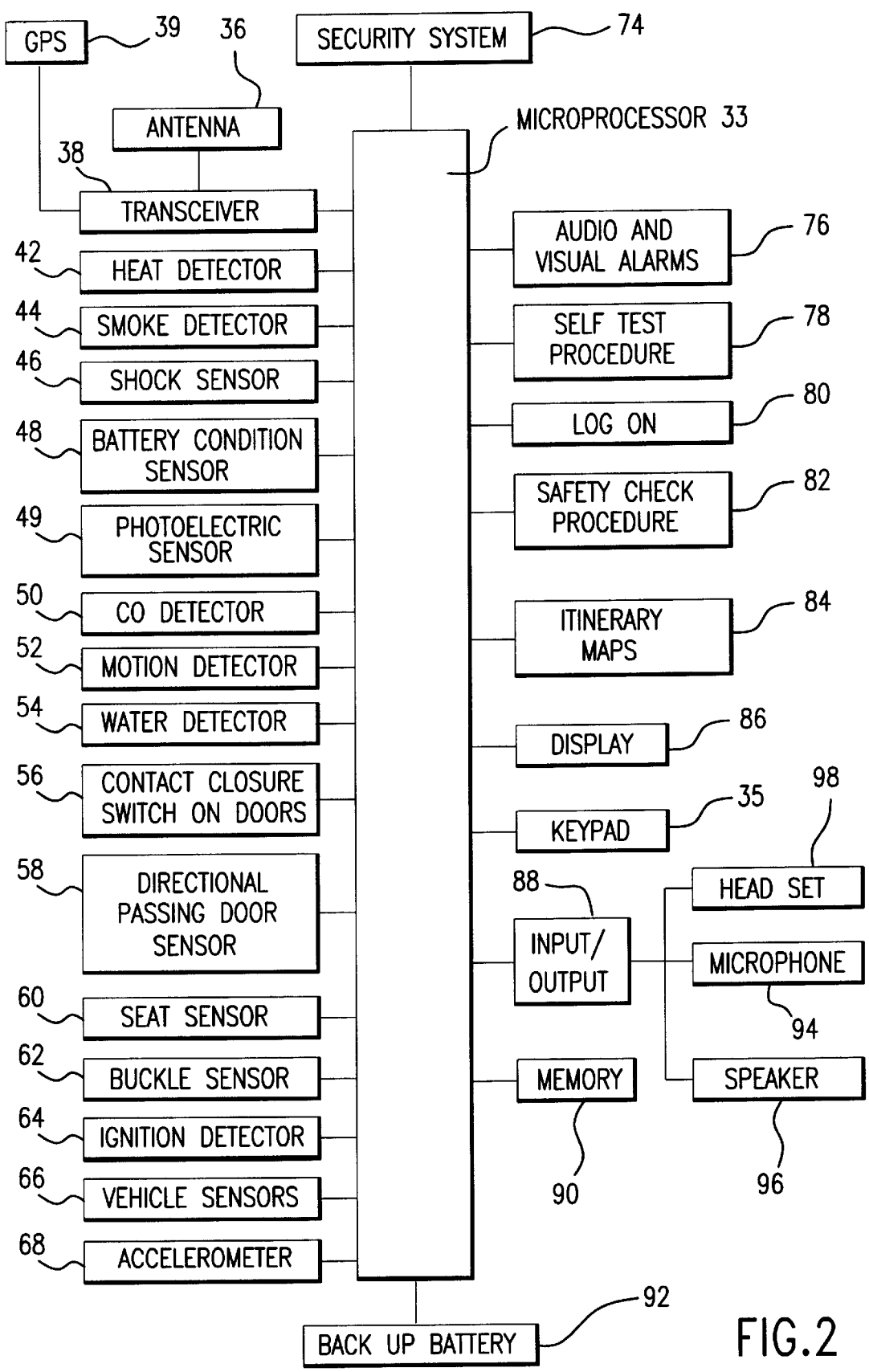
FIG. 2 is a schematic or block diagram showing the microprocessor of the main control unit located in the bus and it's coupling, on one hand, to various sensors, and on the other hand, to various subsystems to effect certain functions.

Referring to FIG. 2, there is shown the microprocessor 33 of the computer, and its inputs and outputs. As shown, the inputs to the microprocessor consist of a number of sensors which detect various conditions that warrant that a warning be announced or indicated. The sensors are all mounted in suitable places on the bus to give a warning of whatever condition is being sensed. These sensors include a heat detector 42 which is a sensor excessive heat, a smoke detector 44 to sense and give a warning of a fire or other condition which produces smoke, a shock sensor 46 to sense any excessive shock to the bus, e.g. a collision, and give an appropriate indication, a battery condition sensor 48 to indicate the condition of the bus battery, a photoelectric sensor 49 to sense an occupant, a CO detector 50 to sense and give a warning of excessive CO content in the air of the bus, a motion detector 52 to give a warning of motion in the bus particularly at a time when the bus is supposed to be unoccupied, a water detector 54 to sense and give a warning if there is an excessive amount of water in the bus, a contact closure switch 56 on all doors to indicate the condition of the doors, a directional passing door sensor 58 to sense and indicate if a person is passing through a door and in which direction, a seat sensor 60 to indicate by means of pressure switch 34 whether a seat is occupied, a buckle sensor 62 to indicate whether the buckle is fastened or not, an ignition sensor 64 to indicate whether the ignition is on or off, and the usual vehicle sensors 66 that are conventional on vehicles. Also, an accelerometer 68 serves as an input to microprocessor 33 to sense the motion, acceleration and speed of the vehicle.

The microprocessor 33 is also coupled to a transceiver 38 that, in turn, is coupled to a GPS 39 so that position can be broadcast via the transceiver. Antenna 36 is connected to the transceiver 38. A state-of-the-art security system 74 is coupled to the microprocessor 33 so that any breach of the security system can be processed and appropriate audio and visual alarms can be initiated via block 76. In addition, the breach or violation of the security system can be broadcast to the central station. A self-test procedure 78 is coupled to the microprocessor, as well as, a logon function 80. A safety check procedure 82 is also, coupled to the microprocessor. Itinerary maps stored in block 84, and a display 86 are coupled to the microprocessor. As previously noted, a keypad 35 and an input/output 88, of conventional design, are coupled to the microprocessor 33 together with a memory 90. Finally, a back-up battery 92 is coupled to be controlled by the microprocessor 33. A microphone 94, speaker 96 and head set 98 are coupled to the I/O 88 in a conventional way.

Figure 4A:
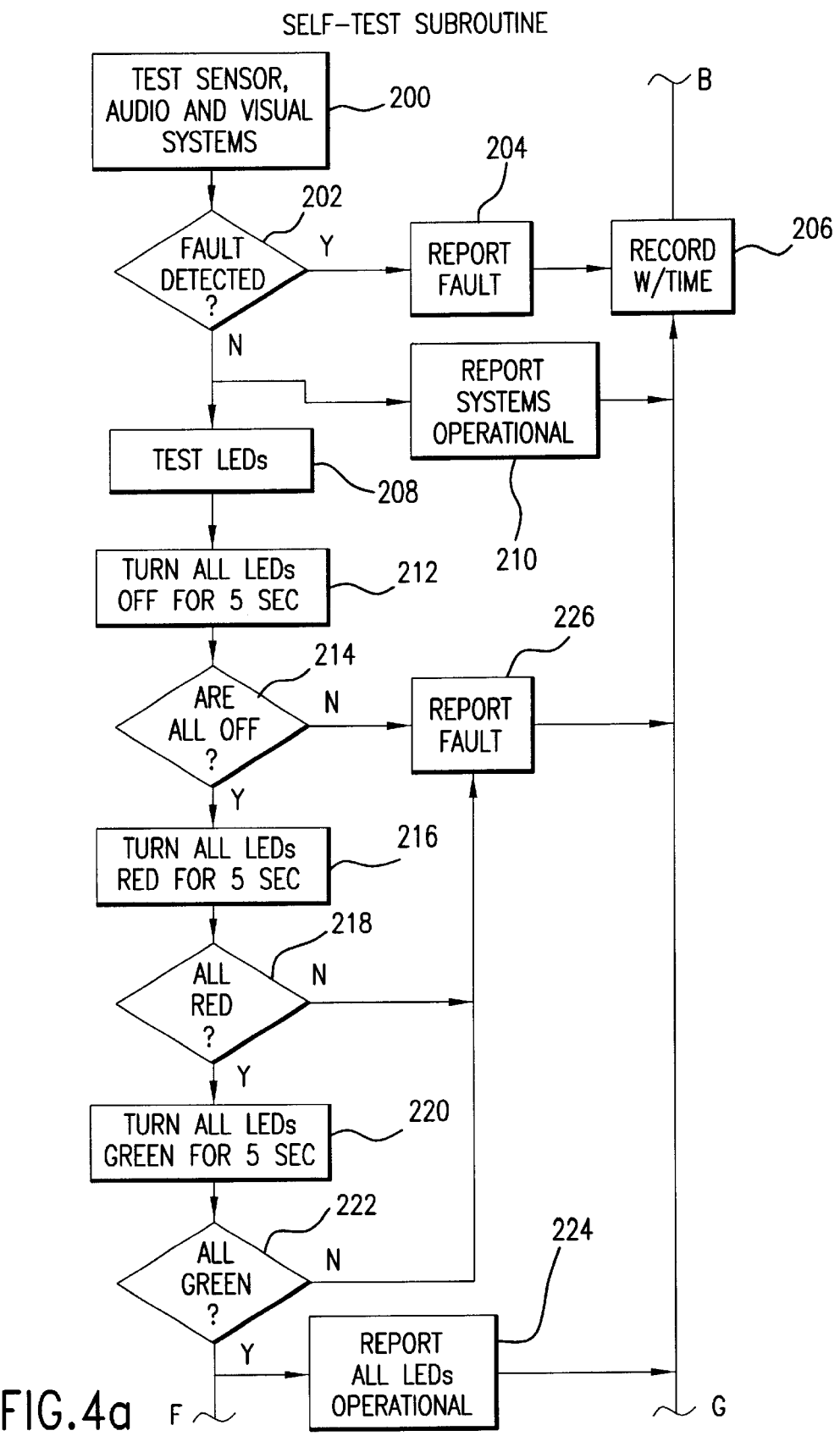
FIGS. 4a and 4b is a flow chart showing the self-test subroutine.
Figure 4B:
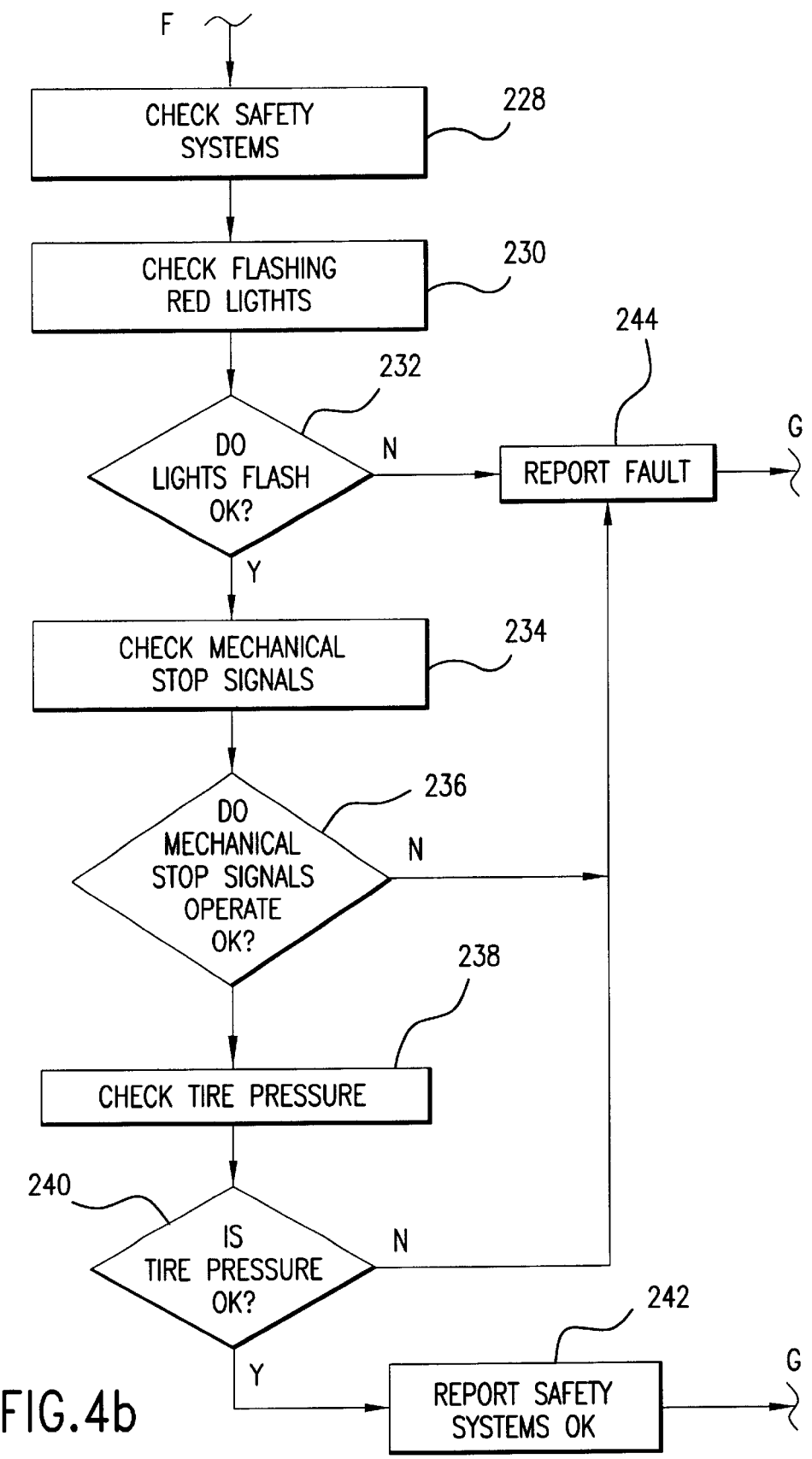
Figure 5:
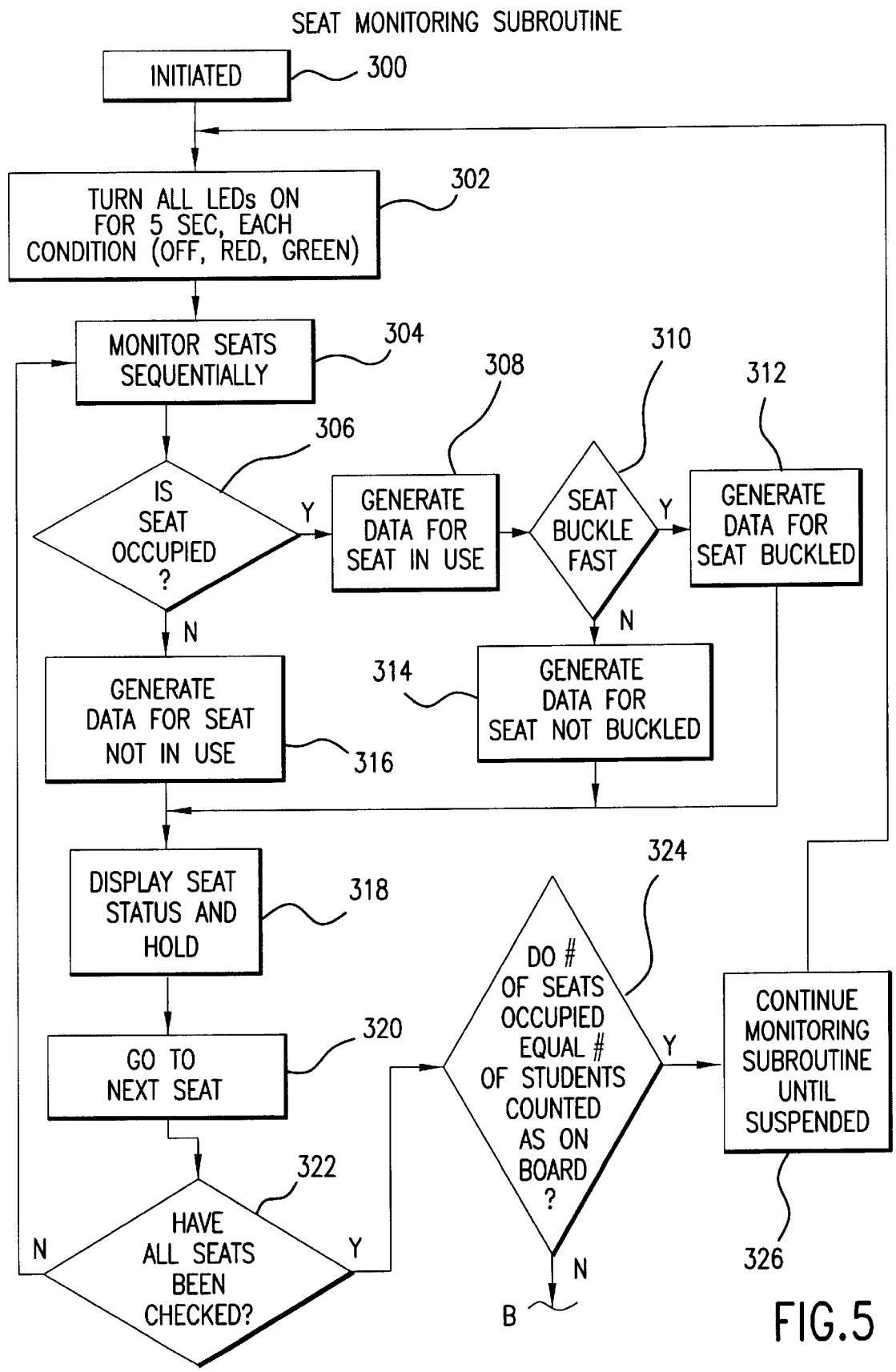
FIG. 5 is a flow chart showing the seat monitoring subroutine.

The composition and function of the safety system of the present invention will best understood if considered and explained in conjunction with the several operational conditions of the bus and the main program and subroutines as showing schematically in flow chart form in FIGS. 3-5. It will be understood that the hardware necessary for the practice of the present invention exists as state-of-the art and will be evident from the description of a preferred embodiment of the invention. Also, the invention will best be understood from the flow charts which describe the various functions of the invention, and from which, persons skilled in the art of computers will understand how to implement and carry out the invention as described. The programming of computers is highly developed, and persons skilled in the art will know intuitively, how to program the computer and microprocessor to obtain the effects of the present invention from the following description.

Consider as the initial condition of the bus that the bus 10 is stationary at rest and secured prior to activation, and with no one on board. This condition usually prevails when the bus 10 has been parked overnight. At this time and condition, the microprocessor 33 is monitoring the various sensors 42-54 to detect any excessive heat, smoke, water, shock, CO or motion. The arrangement of these sensors is well known in the art to those of ordinary skill, so a detailed explanation of their workings and locations is unnecessary to a full understanding of the invention. If any undesirable condition is detected while the bus 10 is unoccupied and at rest, the microprocessor 33 initiates a transmission via the transceiver 38 and antenna 36 to the central station (not shown) to give a warning of the detected condition whereupon appropriate action can be ordered and take place. Also, the vehicle battery is constantly being monitored, as the vehicle battery powers the security system. In the event of low battery, this condition is detected, and the microprocessor 33 initiates the switchover to the back-up battery 92. and alerts the central station via the transceiver. If the security system is breached, or the vehicle starts in motion, or motion is detected inside the bus when it is supposed to be at rest, the microprocessor 33 initiates a transmission to the central station to give warning of the undesirable condition, as well as, to provide an indication of location by means of the GPS.

Consider as the second condition of the bus, the time when the bus is initialized. This normally occurs in the case of a school bus in the morning, when the initial run of the bus is to occur in picking up and taking students to school. At first, the bus driver approaches the bus that has been sitting in the designated overnight parking lot. The driver must first disarm the security system, and, for this purpose, preferably uses a smart card that is swiped on a card reader on the exterior of the bus. Alternatively, the driver can use a remote transmitter, but this requires maintenance. Further, it is possible for the driver to unlock the bus with a key, climb aboard and use the keypad 35 to punch in a disarming code, that is, if remembered. Also, it is possible to disarm the security system using fingerprint recognition or a retinal scan, but the preferred technique is considered to be a smart card with keypad override.

After gaining entry to the bus, the driver sits down in the driving seat, closing a switch, puts the ignition key in the ignition, and the system boots up and self-tests. The microprocessor provides the requisite signals for a readout of the status of the system on the display and stores in memory the time the driver first sat down on the driver's seat and the time the engine started running. The LCD screen of the display is illuminated, and the audio and video systems are tested to be sure they are operational. Then, a fault detection of the passenger seats is tested to determine which are occupied (none should be occupied) and which seat belts are buckled (none should be buckled). The display shows a chart of all seats in the bus arranged by row to simulate the actual arrangement, and all seats are assigned a number. Assigned to each seat on the display is a red light and a green light. During the initial test, all red lights are turned on for a period of 5 seconds, then all green lights are turned on for a period of 5 seconds and then all lights are turned off. This enables a confirmation that the system is functioning properly. All seats should show unoccupied except the driver. Next the driver initiates a safety check of the vehicle to assure that the flashing lights and mechanical stop signals are functioning properly. Finally, the tire pressure is checked.

Any fault detected during the run-up to moving the vehicle is automatically stored in memory and the microprocessor initiates a transmission to the central station reporting the fault details. When everything is satisfactory, the driver initiates a transmission to the central station requesting the itinerary for that day, course and stops. Alternatively, the central station, during the night, may have transmitted details for the next day itinerary to the bus where it is stored in the block. In this case, the driver simply boots up the itinerary from that memory. The GPS system is integrated with the transceiver via a conventional telematics system. In place of the transceiver, a mobile cellular telephone may be used.

Figure 3A:
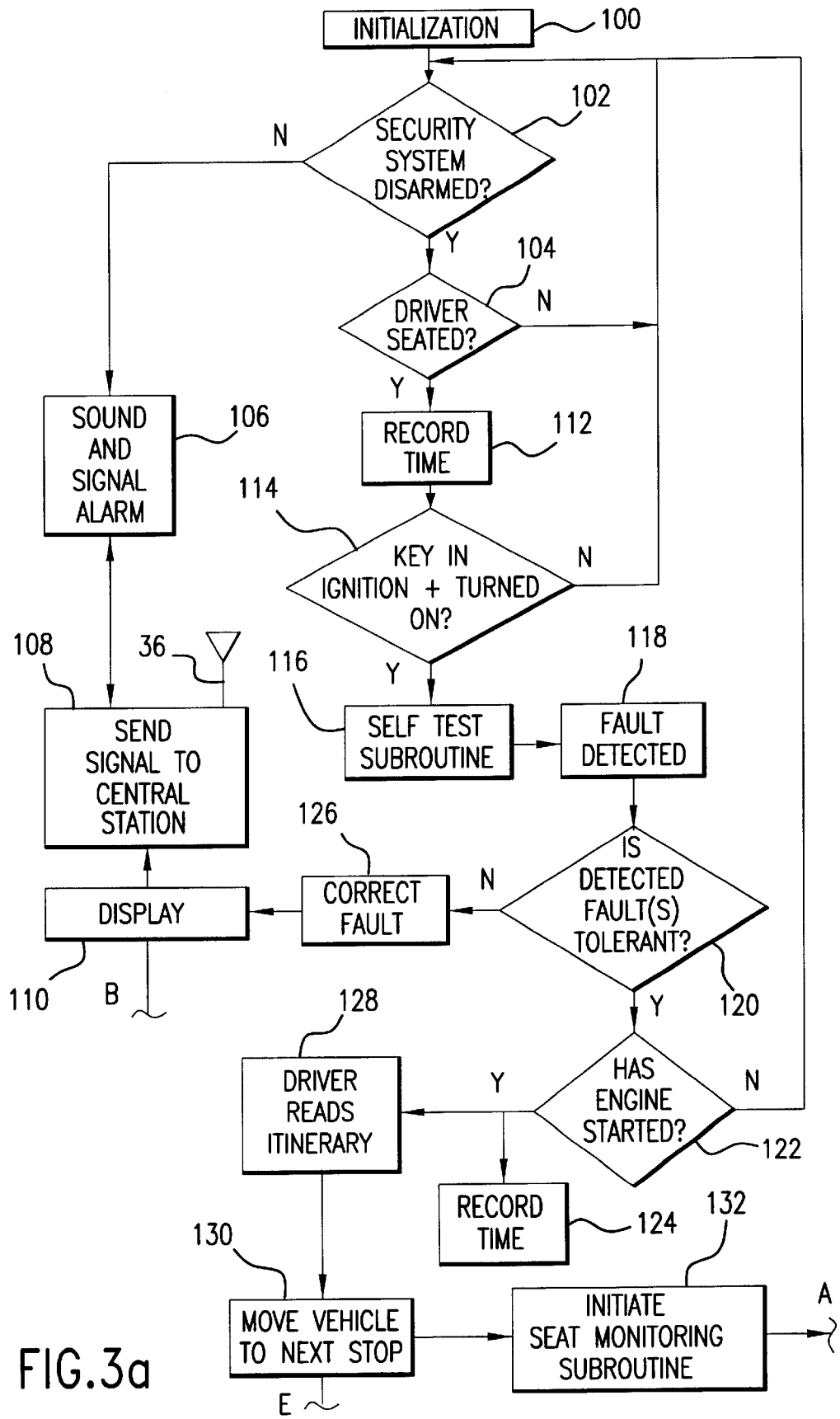
FIGS. 3a, 3b and 3c is a flow chart showing the main program that is run by the microprocessor.
Figures 1, 3B:
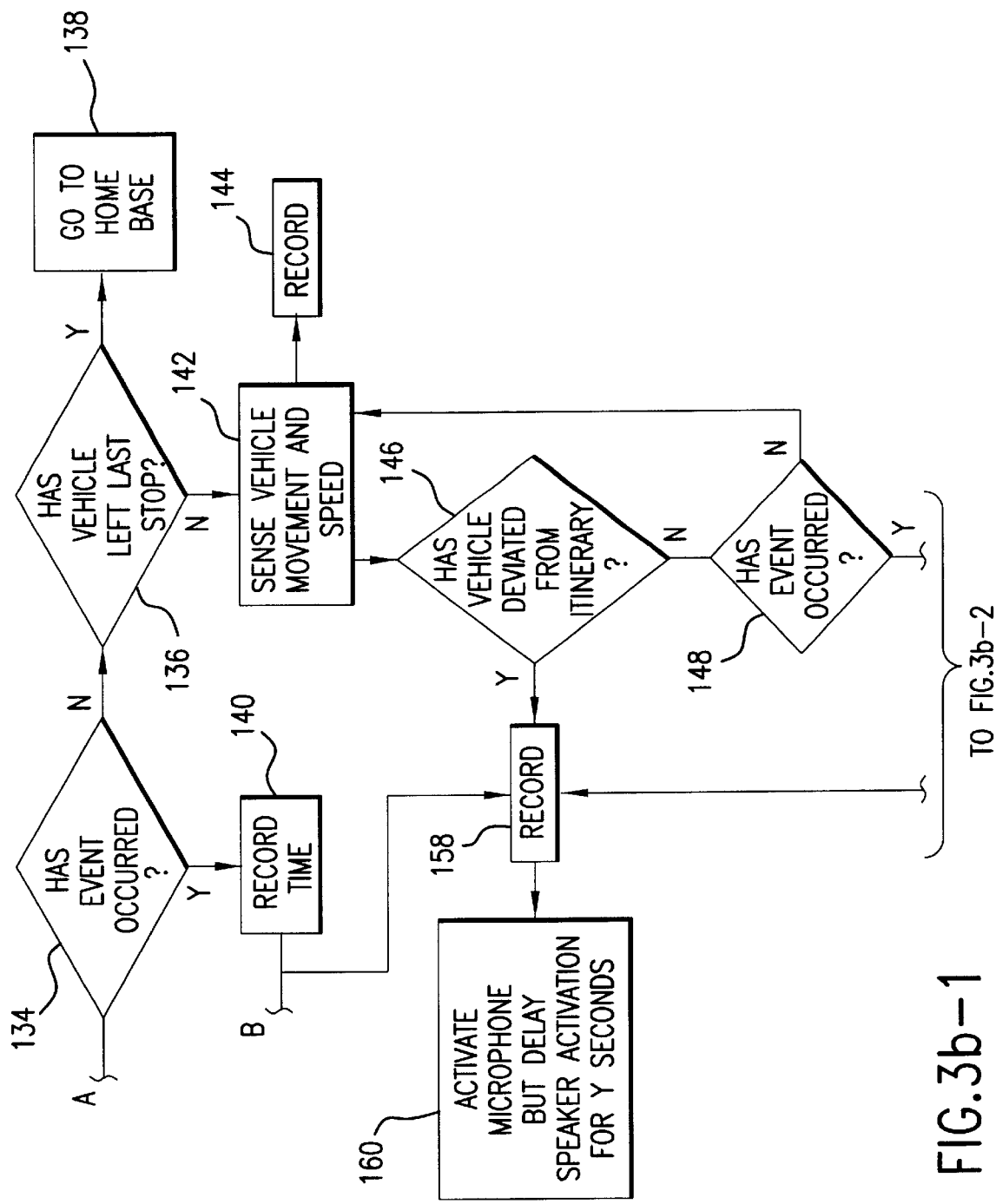
Figures 2, 3B:
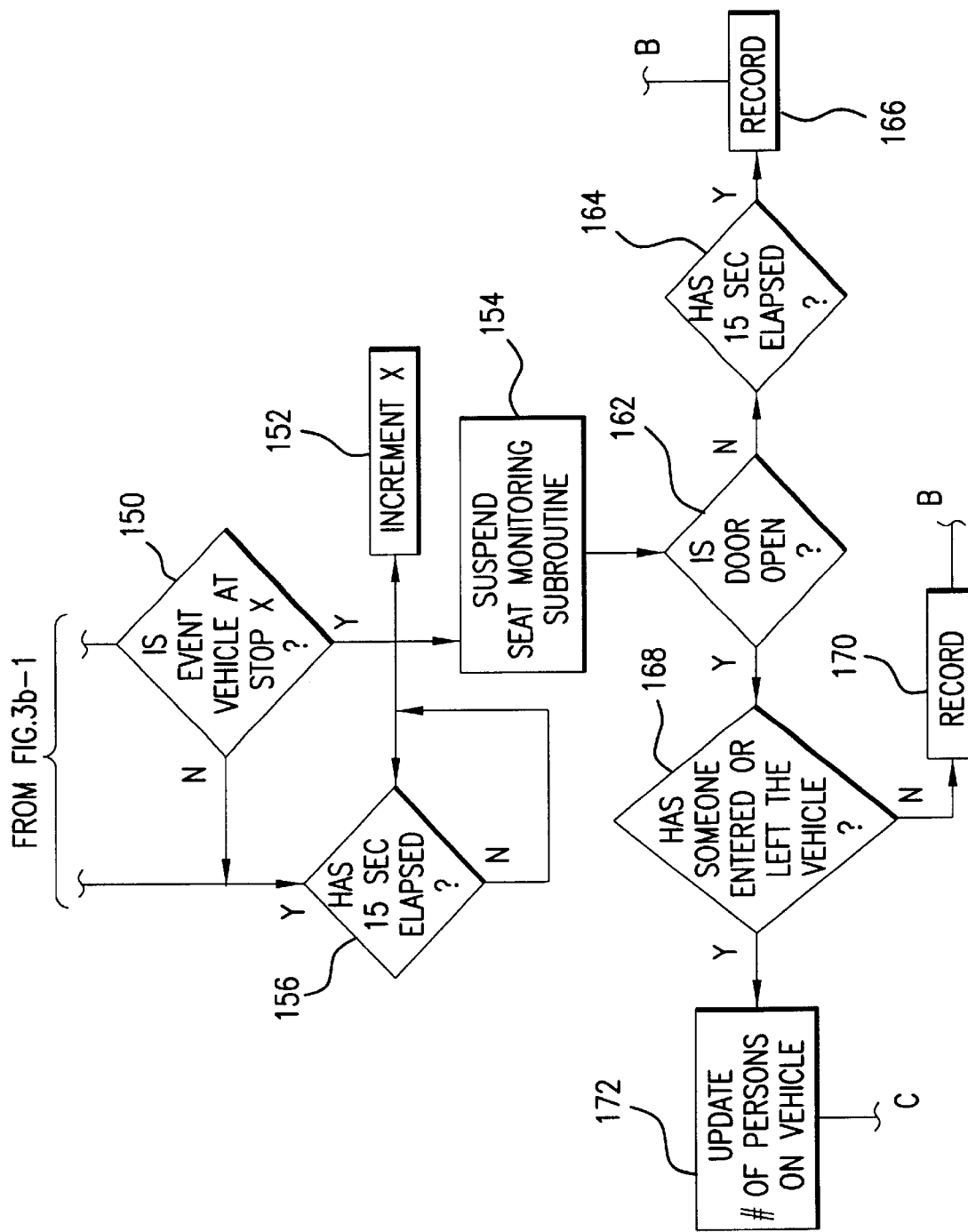
Figure 3C:
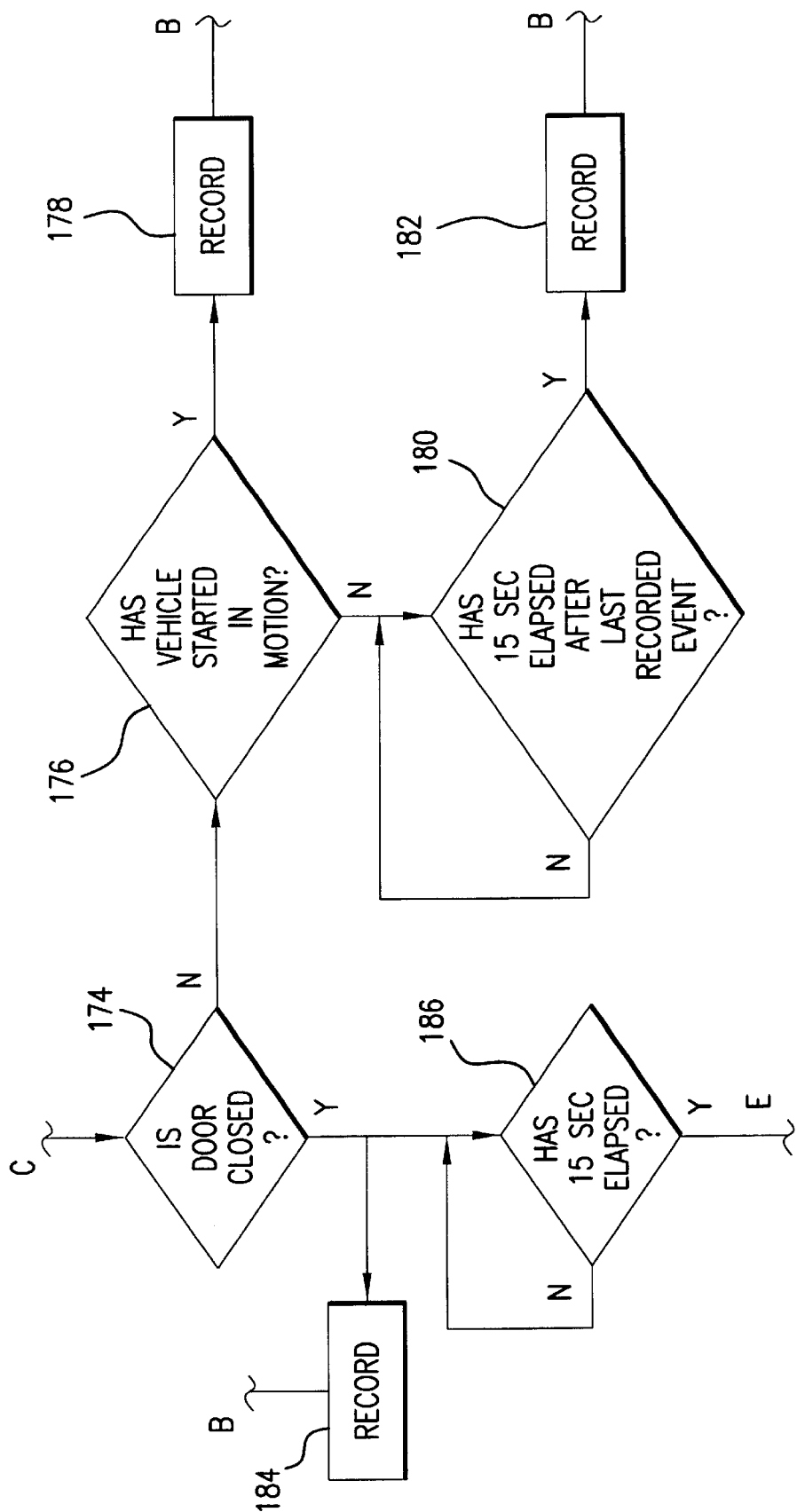

In more detail and with reference to the drawings, and more particularly, FIGS. 3a, 3b and 3c, the main program for the microprocessor is initialized in block 100. In Step 102, the decision is taken whether the security system has been disarmed. If Yes, the program moves to Step 104 where the decision is taken whether the driver is seated. If the answer to Step 102 is No, an alarm is activated, both audibly and visually, in Step 106 and the transceiver is activated in Step 108 to send an appropriate signal to the central station via antenna 36. Also, the alarm condition is displayed in Step 110. If the driver is seated, the answer to Step 104 is Yes, the time is recorded in Step 112 and the data sent to the central station to be recorded. Alternatively, the time is only recorded in Step 112 in the memory of the onboard computer, and the onboard computer is downloaded at preselected intervals, e.g. once a day, at the end of the day when the bus has been parked for overnight storage. If the answer to Step 104 is No, the program loops back to repeat Steps 102 and 104. Following Step 104, the program proceeds to Step 114 where the decision is taken whether the key is in the ignition and turned on. If the answer is Yes, the program proceeds to Step 116 where the self test subroutine is carried out. If the answer to Step 114 is No, the program loops back to Step 102.

The self test subroutine is shown in FIGS. 4*a* and 4*b*, and has the purpose of testing essential components of the system. In Step 200, the self test subroutine is initialized and begun for all audio and visual systems. In Step 202 a decision is taken whether any fault is detected. If the answer is Yes, the fault is reported in Step 204, and stored in memory in Step 206, the time also being recorded. Then, the fault is sent to Steps 110 and 108 for display and reporting to the central station, and optionally to Step 106 to sound and show an alarm, if appropriate. The output of Step 206 is coupled to the Steps 110 and 108, see corresponding points B of FIGS. 3*a* and 4*a*. If the answer to Step 202 is No, the program proceeds to Step 208 where the LEDs which show the condition of occupancy of seats are tested. However, in Step 210, the report is made to the display and central station and stored in the memory that all audio and visual systems are operational.

The testing of the LEDs proceeds in Step 212 by turning all LEDs off for 5 seconds, and in Step 214, the decision is taken whether all LEDs are in fact off. If Yes, the program proceeds to Step 216 where all LEDs are turned on red for 5 seconds, and in Step 218, the decision is taken whether all LEDs are red. If Yes, in Step 220 all LEDs are turned green for 5 seconds, and in Step 222 the decision is taken whether all LEDs are in fact green. If Yes, in Step 224 it is reported that all LEDs are operational. This report is stored in memory and shown on the display and optionally sent to the central station. If the answer to any one of Steps 214, 218 and/or 222 is No, a detailed report is made via Step 226 to the display, central station and stored in memory. In case of fault, the driver may make a decision to replace the offending LED or may rope off the seat corresponding to the offending LED.

The program now proceeds to Step 228 where a check of the safety systems begins. Again, corresponding points F are coupled. In Step 230, the flashing red lights on the school bus are checked, and in Step 232 the decision is taken whether the lights do in fact flash properly. If the answer is Yes, the program proceeds to Step 234 where the mechanical stop signals are checked to make sure they operate properly. These are the Stop signs on the side of the bus that swing out to caution motorists that the bus is stopped and that they must stop. These signs work in conjunction with the flashing lights to control traffic in the vicinity of the bus when it is stopped and taking on or discharging children. In Step 236 the decision is taken whether the mechanical stop signs operate properly. If Yes, the program proceeds to Step 238 where the tire pressures are checked. In Step 240, the decision is taken whether the tire pressure on the vehicle wheels is proper. If the answer is Yes, then a report is made in Step 242 that all safety systems are operational and proper. Corresponding Points G are coupled together (FIGS. 4*a* and 4*b*). If the answer is No to any of Step 232, 236 or 240, a report is made in Step 244, the data stored in memory, and optionally a report of the details is sent to the central station. The records of the safety events are recorded in memory in detail including the time. This completes the self test subroutine, and the main program then continues, see FIG. 3*a* in Step 118, where the detected faults, if any, are analyzed in detail to determine their nature, seriousness and impact on the system.

In Step 120 a decision is taken whether the fault detected, if any, is tolerant. If Yes, or no fault, the driver starts the engine preparing to move the bus, and in Step 122 a decision is taken whether the engine has been started. If Yes, the time and the event are recorded in the usual manner described in Step 124. If the answer to Step 120 was No, the detected fault is corrected in Step 126, if possible, with the data regarding correction or no possibility of correction being forwarded to display in Step 110, and the central station in Step 108. Following starting of the engine, the driver reads out the itinerary for the day in Step 128 and starts to move the bus to the first stop of the day in Step 130. The itinerary is preloaded into the memory 84 for the itinerary maps, usually by the central station, based on the pattern control established for that particular day. This can occur at any time via the transceiver 38, but is best done either at the end of a day's run when the bus has returned to its overnight parking place, or during the night to ready the bus for the next day. As soon as the bus starts to move toward the first stop, the seat monitoring subroutine is initiated in Step 132 and continued as long as the bus is in motion. When the bus reaches a stop, the seat monitoring subroutine is suspended until the door(s) are closed and the bus starts in motion toward the next stop.

The seat monitoring subroutine is shown in FIG. 5 and consists of the following routine. In Step 300 the subroutine is initialized and the routine proceeds to Step 302 where all LEDs correlated with the seats in the bus and indicative of the occupancy condition of the seats, are turned to each condition for a period of 5 seconds to verify their operability. In place of using LEDs, a LCD can be used, and programmed to function in the same manner. Also, with a LCD, a touch screen can be used. The three conditions are OFF indicative of an unoccupied seat, RED indicative of an occupied seat and GREEN indicative of an occupied seat and a buckled seat belt. Following verification, the routine proceeds to Step 304 for monitoring the seats sequentially. In Step 306 the decision is taken for the first seat whether it is occupied. If Yes as determined by the seat switch 34, data is generated in Step 308 for the seat in use. Next, in Step 310 a decision is taken whether the seat buckle is fastened as determined by the switch associated with the seat buckle. If the answer is Yes, data is generated in Step 312 for an occupied seat that has its seat buckle buckled. If the answer in Step 310 is No, data is generated for an occupied seat that does not have a seat buckle buckled in Step 314. If the answer is No to Step 306, data is generated in Step 316 for a seat not occupied (not in use). The data generated in Steps 312, 314 and 316 is collated and sorted in Step 318 and displayed on the display 35 or such other display as may be provided for such purpose, so the driver can tell which seats are not in use, which seats are occupied and which seats that are in use have the seat belts fastened. The display hold until the status changes, or may be refreshed at intervals. The routine proceeds to Step 320 which continues the sequential monitoring until in Step 322 it is determined that all seats have been checked. If the answer to the question have all seats been checked is No in Step 322, the routine loops back to Step 304 and repeats for the next seat. When the answer to Step 322 is Yes, the decision is taken in Step 324 whether the number of occupied seats equal to the number of students counted as boarding the bus, and still on the bus (including the driver). If the answer is Yes, the routine proceeds to Step 326 and the routine loops back to the beginning either immediately or with a predetermined delay, e.g. of 30 seconds, and the routine is repeated. The subroutine for monitoring the seats continues while the bus is in motion and suspends during a stop when the door is open, but not during a stop for a red light or stop sign when the door is not open.

Considered as the next condition of the vehicle is when the vehicle starts to move. Describing the circumstances in a general way, the movement and speed of the bus are stored in memory as the vehicle moves from its origination point and proceeds to the first stop on the itinerary for that day. As the vehicle proceeds, the microprocessor 33, constantly updates the estimated time of arrival at the first stop relative to the preplanned itinerary. If there is any deviation from the itinerary or any incident, such as the triggering of any sensor, considered herein as an event, all data regarding such event is recorded in memory for a predetermined time, for example seven days, and may be erased after the predetermined time. Also, at the end of each day, the microprocessor downloads the memory via the wireless connection to the central station. For a deviation from the itinerary, a warning signal is sent to the central station via the wireless link, and a microphone is activated so that the central station can monitor audibly what may be transpiring on the bus. The bus has a microphone and a speaker. For a deviation, there is a predetermined delay, for example 15 seconds or 30 seconds, in activating the speaker, however, the central station can override the delay in case of an emergency. The driver is provided with a password and/or one or more key phrases so that upon interrogation by the central station, the driver will be able to communicate the situation on the bus, even if under duress.

The system is such that the driver can signal to the central station at any time, and can dial in to make a wireless connect via telephone, in order to report an emergency or request instructions or information. Also, the system is provided with a panic button on the console that is mounted on the dashboard, or otherwise located within the driver's space for the purpose of enabling the driver to hold in the button for a predetermined time, say 5 seconds, and the central station will be automatically signaled to call 911, and will be informed of the location of the bus due to the continuous activation and updating of the GPS and the transceiver. The push button can be programmed for alternate activation to distinguish between a life threatening emergency and the need for road assistance. All such actions constitute events and are recorded in memory, and a signal is sent to the central station. Also, the driver may have two buttons, one for emergency and one for roadside assistance.

In the case of activation of the impact sensor, the shock sensor, this is an event and recorded in memory and a signal is sent to the central station so indicating. As the bus in normal operation may be subjected to shocks or impact, such as a student banging on the side of the bus, the impact or shock sensor is provided with a suitable discrimination filter, so that all events below xG force are blocked, and no activation of the impact or shock sensor is evident or recorded. The value x is preselected so that casual impacts or shocks, such as riding over a bump in the road will not activate the sensor. For shocks and impacts above xG force, the sensor is activated, and the event is recorded in memory. Like all recording of events, the time is recorded, and the identification of the sensor activated. Also, a signal is sent to the central station to alert to the event, and the central station can check with the driver over the telecommunication link about the nature and extent of the event.

Consider the next condition of the vehicle as occurring when the bus reaches the first stop. Stopping is the first event, and the event is duly recorded in memory and the time noted. The driver pushes a button on the console that instructs the microprocessor to mark the stopping point and automatically update the itinerary. The itinerary is displayed as a route map on the LCD screen situated before the driver with the stops highlighted and the route marked. A highlighted line indicates the progress of the bus. This is accomplished using known technology.

The driver opens the door, an event, and a student enters the bus through the open door, an event. The door is provided with sensors to show the condition of the door, open or closed, and sensors to show someone passing through the door and the direction of passing to indicate whether a student is entering the bus or departing from the bus, either being an event. Thus, the system begins to increment and/or decrement the entry into the bus of students, and thereby maintains a count of the number of student who are on the bus at any given time. The sensors suitable for this purpose may be photocells, but any know type of sensor may be used for this purpose. Also, in place of the sensors, the driver may control an electronic entry device to count the students entering and leaving the bus with the data being recorded in the memory via the microprocessor.

After entry into the bus, a student goes to a seat and sits down, an event, buckles the seat belt, an event. Meanwhile, the driver is visually monitoring the activity in the bus by watching the rear view mirror and the display where all seats are displayed. By the light or other indication associated with each seat location on the monitor or screen, the driver can tell whether the student has sat down, and if the student has buckled the seat belt. The normal light condition on the screen of an unoccupied seat is "light OFF". If a seat is occupied, the light condition on the screen is "red ON". If a seat is occupied, and then the buckle is buckled, the light condition on the screen is "green ON".

Having electronically counted the students entering the bus, the system displays to the driver the number of students on the bus. The system then checks to count the number of seats occupied, and compares this number with the number of students to be sure there is agreement. If no agreement, an event, an audible signal is sounded and the driver is further alerted by a visual signal on the screen indicating non-agreement. Next the system checks to compare if for all occupied seats, the buckles are buckled. At the same time the driver is able to visually monitor the buckling of seat belts, by checking whether any red lights still appear on the LED or LCD display. When everything checks out, the driver closes the door preparatory to placing the bus in motion. If any light remains red at this time, or turns red as the door is closed, an event, an audible signal sounds to alert the driver to the event. A further refinement consists in lights above the window level for each row on each side of the bus. If a seat buckle is not buckled or a seat that was occupied becomes unoccupied, without a corresponding decrement in the student count, the light associated with the seats including the offending seat location starts to flash to focus the driver's attention quickly to that location so the driver can deal with and correct the situation. Preferably the light flashes red.

The driver closes the door, an event, and puts the bus in motion. If after the bus is put in motion, a seat buckle is unbuckled and/or a seat becomes unoccupied that was occupied when the bus first went into motion, an event, an audible alarm is sounded and the flashing red light associated with the offending seat location is turned on. The driver can slow or stop the vehicle and demand compliance. Further, the system includes a PA system in the bus and the driver can wear a headset to speak over the PA system. The driver has a switch on the dashboard, or via a wireless connection, that can be actuated to turn on the PA system, so the driver can demand compliance, and be heard over any commotion or catcalling or other noise that may be ongoing.

The bus proceeds from stop to stop in the manner described above. The final condition occurs when the bus has completed its run for the day and returns to the depot to be shut down and secured until required for the next day's operation. When the bus is finally parked for the night, the driver inputs an instruction for all systems to go to standby and the security system is automatically turned on. The microprocessor automatically downloads the event log from the memory to the central station via the telecommunication link, and inquires regarding any updates, particularly regarding the map of the next day's itinerary. Updates are sent from the central station either immediately, or sometime during the night and before the next day's run. The system has recorded in memory the serial number of the transceiver and its ESN electronic serial number, as well as, the VIN number of the vehicle and the vehicle license tag. This data is encoded in the signals to the central station to inform the central station of which vehicle is sending. The central station also uses this data encoded in its messages to the vehicle to assure that the correct vehicle is being addressed.

In the case of any door being open during motion of the bus, particularly, the emergency door, this is sensed and is considered as an event, An alarm is signaled both audibly and visually, and a signal is sent to the central station so indicating.

Reverting again to the main program as shown on FIGS. 3a, 3b and 3c, when the vehicle is first put into motion in Step 130 and the seat monitoring subroutine is initiated in Step 132, the program takes the decision in Step 134 of whether an event has occurred. If the answer is No, the program proceeds to the decision in Step 136 of whether the vehicle has left the last stop on its itinerary. If the answer is Yes, the vehicle proceeds to home base in Step 138. If the answer to the decision in Step 134 is Yes, the event is recorded in Step 140 along with the time and data of the nature of the event with the data and information forwarded to the display in Step 110, the central station in Step 108 and signaling alarm in Step 106, as appropriate. In the foregoing points A are coupled as are points B in the flow charts. If the answer to the decision in Step 136 is No, the program proceeds to Step 142 where the vehicle movement and speed are sensed and recorded in memory in Step 144.

Next, in Step 146 the decision is taken whether the vehicle has deviated from its preplanned itinerary. If the answer is No, the decision is taken whether an event has occurred in Step 148. If the answer is No, the program loops back to Step 142 and continues. If the answer is Yes, the decision is taken in Step 150 whether the event is the vehicle has stopped at stop X (the next stop on the itinerary). If the answer is Yes, X is incremented in Step 152, the seat monitoring subroutine is suspended in Step 154, and a 15 sec countdown is initiated. In Step 156 the decision is taken whether the 15 sec countdown is completed, and if No, then the program loops on itself. In all event recording, especially regarding a deviation from itinerary or an unscheduled stop, a microphone is activated in Step 160 so the driver can talk with the central station to report relevant information. Also, a speaker is activated so the central station can speak to the driver for two-way communication. However, the speaker activation is delayed for Y seconds, e.g. 15 or 30 seconds, as a security feature, in the case of high-jacking or the like, so the central station can listen to what is happening on the bus, without anyone on the bus, except the driver being aware of the established communication link. Also, a digital camera may be mounted at the front of the bus aimed rearward to be able to view the bus interior. The output of the digital camera is recorded in memory and may be accessed by the central station for immediate viewing in the case of a real or perceived emergency or simply to periodically check on what is happening on the bus. Preferably the output of the digital camera is fed via the transceiver to the central station for recording. Also, a digital camera can monitor the driver with the signal being fed to the central station.

After the seat monitoring subroutine is suspended in Step 154, the program proceeds to Step 162 where the decision is taken whether a door is open. If the answer is No, a 15 second countdown is initiated in Step 164 and monitored to determine completion. When the answer is Yes, the 15 seconds has elapsed, in Step 166 the event is recorded and sent via the coupling of points B to the Steps 110, 108 and 106 where the appropriate action is taken. If the answer to Step 162 is Yes, the decision is taken in Step 168 whether someone has entered or left the bus. If the answer is No, the event is recorded in Step 170 and the data sent along like in Step 166. If the answer is Yes, then in Step 172, the number of persons on the bus is updated in the memory, and the program proceeds to Step 174 where the decision is taken whether the door is closed. If the answer is No, the decision is taken in Step 176 whether the bus has started in motion. If the answer is Yes, the event is recorded in Step 178 and the data is sent the usual way to memory, display and alarm for appropriate action. If the vehicle has not started in motion, the answer is No to Step 176, a 15 second countdown is initiated in Step 180, and when Yes, recorded in Step 182 and reported in the usual way. If the answer to Step 174 is Yes, the event is recorded in Step 184 and reported in the usual way. The program proceeds to Step 186 for a 15 second countdown. When the answer to the countdown is Yes, the program loops back via coupled points E to Step 130, and continues repeating until the answer to Step 136 is Yes.

The transceiver and communication link is provided with a no service alarm and indication. Every sixty seconds, the transceiver sends an operational signal to the central station. Also, the driver is provided with the capability of by-passing certain sensors in the case of a bad seat or to force agreement, if he can determine a false count. Further, all buttons, keyboard and display are localized in an integrated control panel, and preferably are integrated into a single touch screen, within easy access and reach of the driver. The seat belts are wound on reels spring loaded, as conventional, and stored in housings. In addition to the switch that signals the fastening and unfastening of the buckle, a second switch or sensor is provided that is actuated when the seat belt has been unreeled and withdrawn a predetermined distance from its housing to sense that the seat belt is actually wrapped around a passenger, and not bypassing the passenger by being buckled behind the passenger while he/she is sitting on the seat.

Although the invention has been described with respect to 15 second countdowns, it will be appreciated that the driver may be provided with the ability to override all delays. Also, it will be appreciated that when an event occurs during motion of the bus, the occurrence of the event will automatically interrupt the seat monitoring subroutine, which may not be initiated until reset automatically by the system restarting or manually by the driver. Further as previously noted, the communications link enables the central station to update the system. To this end, whenever the central station wishes to update, first it sends an inquiry to the bus to determine via the GPS the location and status of the bus. If the location and status are accepted, the time and date and other data are transmitted to the bus and duly recorded in memory. This is usually done once a day but may be done at more frequent intervals. A further refinement of the invention concerns the use in the bus of seat belts that couple via a solenoid latching, that is a spring actuated latch holds the buckle together, but may be release through activation or deactivation of a solenoid, so that the buckles release. The solenoid can be manually overridden by releasing the buckle through the operation of a button or lever as is customary. The advantage of this arrangement is that in the event of an emergency, it is possible for the driver to press a button for 5 seconds and release all buckles. Also, in the event of a crash or water in the bus, the impact sensor 46 or water detector 54, respectively, will sense such a condition. In the case of impact, the release of the buckles occurs after a 10 second delay, or when motion of the bus ceases, as detected by an appropriate sensor. For sensing water in the bus, the buckles will release automatically when the water reaches a predetermined height in the bus. The digital camera, if off, is turned on if a sensor is activated or whenever the driver by-passes any system.

Although the invention has been described in terms of a preferred embodiment, changes are possible as will occur to those skilled in the art. Such changes as do not depart from the spirit of the invention as expressed in the appended claims are deemed to fall within the purview of the invention.

What is claimed is:

1. A safety system for buses, and in particular school buses, comprising:

a) a bus including a plurality of rows of seats for students riding on me bus, with at least one aisle running lengthwise of the bus, each row of seats comprising a plurality of seats with at least one seat of the plurality of seats on each side of the aisle, a safety seat belt with a buckle connection mounted at each seat for buckling in a student sifting on the seat, a forward seat for a driver, and a door through which students enter and leave the bus;

b) a first sensor associated with each seat to sense and output a signal indicative of whether a student is occupying the associated seat;

c) a second sensor associated with each seat belt to sense and output a signal indicative of whether a student occupying the associated seat is buckled in;

d) a third sensor sensing directional movement through said door to sense and output signals indicative of entry and exit of students through said door;

e) an alarm actuated responsive to a predetermined signal;

f) a display located within the vision of a bus driver while normally operating the bus that displays to a driver a seat chart in the form of an array of visually perceived indicators arranged in a pattern correlated with the plurality of rows of seats in the bus and provides displaying indicia for visually identifying row and seat for each of the plurality of seats, each said indicator visually indicating one of three conditions for each said seat, a first condition being that said seat is unoccupied, a second condition being that the seat is occupied but the seat belt is not buckled, and the third condition being that the seat is occupied and the seat belt is buckled;

g) an input, operable by a driver, for generating an input signal;

h) a memory;

i) a processor coupled to (I) the first, second and third sensors to receive the output signals therefrom, (ii) the alarm for providing to the alarm the predetermined signal to actuate the alarm, (iii) the memory for storing in memory collected and collated data concerning the output signals from the sensors, the status of sensors and the status of the display, and for retrieving from memory such data, (iv) the display to drive the visual indicators to indicate the status of each seat regarding occupation and seat belt and (v) the input to receive the input signal, said processor further including circuitry to determine an updated head count of students on the bus from the signals received from the third sensor, and to compare the updated head count of the students on the bus with the data relative to the output signals from the first sensors indicative of seat status, and responsive to a mismatch, to initiate the predetermined signal to activate the alarm.

2. A safety system for buses, and in particular school buses, according to claim 1 further including a motion indicator wherein said further circuitry of the processor is operable responsive to a motion indicator indicating that the bus is in motion.

3. A safety system for buses, and in particular school buses, according to claim 1 wherein the indicators on the display show the three conditions as first condition—no light, second condition—red, and third condition—green.

4. A safety system for buses, and in particular school buses, according to claim 2 wherein the indicators comprise three LCDs to indicate the three conditions.

5. A safety system for buses, and in particular school buses, according to claim 2 wherein any indicator on the display will flash for a change in seat status while the motion indicator is indicating bus is in motion.

6. A safety system for buses, and in particular school buses, according to claim 1 further comprising a fourth sensor for monitoring a seat having a seat back and a seat cushion comprising a beam that traverses the space above a seat normally occupied by a student when seated on the seat that outputs a signal indicative of the status of the seat relative to being occupied.

7. A safety system for buses, and in particular school buses, according to claim 6 wherein the fourth sensor comprises a beam generator mounted in the bus in front of the seat being monitored with the beam directed backward in the bus toward the seat back at a location spaced above the seat cushion, and a reflective patch is mounted on the seat back to intercept and reflect the beam back toward the beam generator.

8. A safety system for buses, and in particular school buses, according to claim 6 wherein the processor receives the output signal of the fourth sensor, and responsive a preselected condition of the fourth sensor output signal activates the alarm.

9. The safety system for buses, and in particular school buses, according to claim 1 further including a telecommunications link between the bus and a remote station operable by the bus driver while normally operating the bus.

10. The safety system for buses, and in particular school buses, according to claim 1 further including a global positioning system coupled to the telecommunications link to provide to the remote station bus location.

11. The safety system for buses, and in particular school buses, according to claim 1 further including sensors to detect shock, heat, smoke, CO, and water.

12. The safety system for buses, and in particular school buses, according to claim 1 further including an accelerometer to sense the motion and speed of the bus.

13. The safety system for buses, and in particular school buses, according to claim 1 further including a memory for recording events sensed.

14. The safety system for buses, and in particular school buses, according to claim 13 wherein events sensed are recorded in the memory for recording events.

15. The safety system for buses, and in particular school buses, according to claim 1 further including tire pressure sensors.

16. The safety system for buses, and in particular school buses, according to claim 1 further including a digital camera for viewing the interior of the bus, and sending signals via a telecommunications link to a remote station.

17. The safety system for buses, and in particular school buses, according to claim 1 further including a memory for storing itinerary maps whereby the remote station can update the itinerary maps in the memory.

18. The safety system for buses, and in particular school buses, according to claim 1 further including a self-test program controlled by the processor for checking the safety equipment on the bus including flashing lights, mechanical swinging stop sign and tire pressure.

19. A safety method for buses, and in particular school buses, comprising the steps of:
   a. providing a bus including a plurality of rows of seats for students riding on the bus, with at least one aisle running lengthwise of the bus, each row of seats comprising a plurality of seats with at least one seat of the plurality of seats on each side of the aisle, a safety seat belt with a buckle connection mounted at each seat for buckling in a student sitting on the seat, a forward seat for a driver, and a door through which students enter and leave the bus;
   b. a first sensing associated with each seat sensing and outputting a signal indicative of whether a student is occupying the associated seat;
   c. a second sensing associated with each seat belt sensing and outputting a signal indicative of whether a student occupying the associated seat is buckled in;
   d. a third sensing of directional movement through said door sensing and outputting signals indicative of entry and exit of students through said door;
   e. signaling an alarm responsive to a predetermined signal;
   f. displaying within the vision of a bus driver while normally operating the bus a seat chart in the form of an array of visually perceived indicators arranged in a pattern correlated with the plurality of rows of seats in the bus and providing displaying indicia for visually identifying row and seat for each of the plurality of seats, each said indicator visually indicating one of three conditions for each of said seats, a first condition being that said seat is unoccupied, a second condition being that said seat is occupied but the seat belt is not buckled, and the third condition being that said seat is occupied and the seat belt is buckled;
   g. establishing an input, operable by a driver, for generating an input signal;
   h. establishing a memory;
   i. providing a processor (i) to receive output signals from the first, second and third sensing steps, (ii) to provide the alarm responsive to the predetermined signal, (iii) to store in memory collected and collated data concerning the output signals from the sensing steps, the status of sensing and the status of the displaying step, and to retrieve from the memory such data, (iv) to drive the visual indicators of the displaying step to indicate the status of each seat regarding occupation and seat belt and (v) to receive the input signal,
   j. determining an updated head count of students on the bus from the third sensing step, and comparing the updated head count of the students on the bus with the date relative to the output signals from the first sensing step indicative of seat status, and
   k. initiating the predetermined signal to activate the alarm responsive to a mismatch between the updated head count of the students on the bus with the data relative to the output signals from the first sensing step indicative of seat status.

20. The safety method for buses, and in particular school buses, according to claim 19 including the further step of sensing shock, heat, smoke, CO, and water.

21. The safety method for buses, and in particular school buses, according to claim 19 including the further steps of sensing the motion and speed of the bus.

22. The safety method for buses, and in particular school buses, according to claim 19 including the further step of telecommunicating between the bus and a remote station while the bus driver is operating the bus.

23. The safety method for buses, and in particular school buses, according to claim 19 including the further step of telecommunicating global positioning of the bus to a remote station to inform the bus location.

24. The safety method for buses, and in particular school buses, according to claim 19 including the further step of recording events sensed.

25. The safety method for buses, and in particular school buses, according to claim 24 including the further step of controlling the sensing and recording events sensed.

26. The safety method for buses, and in particular school buses, according to claim 19 including the further step of sensing tire pressure.

27. The safety method for buses, and in particular school buses, according to claim 19 including the further steps of digitally viewing the interior of the bus, and sending corresponding digital signals via a telecommunications link to a remote station.

28. The safety method for buses, and in particular school buses, according to claim 19 including the further step of storing itinerary maps.

29. The safety method for buses, and in particular school buses, according to claim 19 including the further step of programming the processor to conduct a self test program for checking the safety equipments on the bus including flashing lights, mechanical swinging stop sign and tire pressure.

* * * * *